Figure 3:
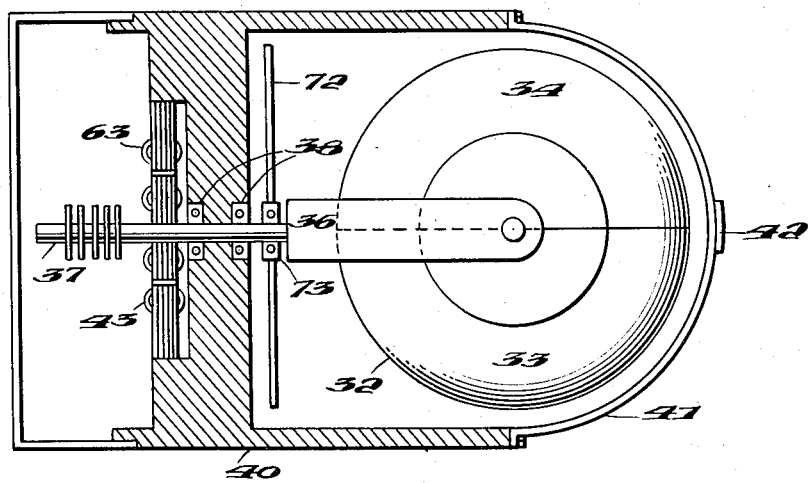

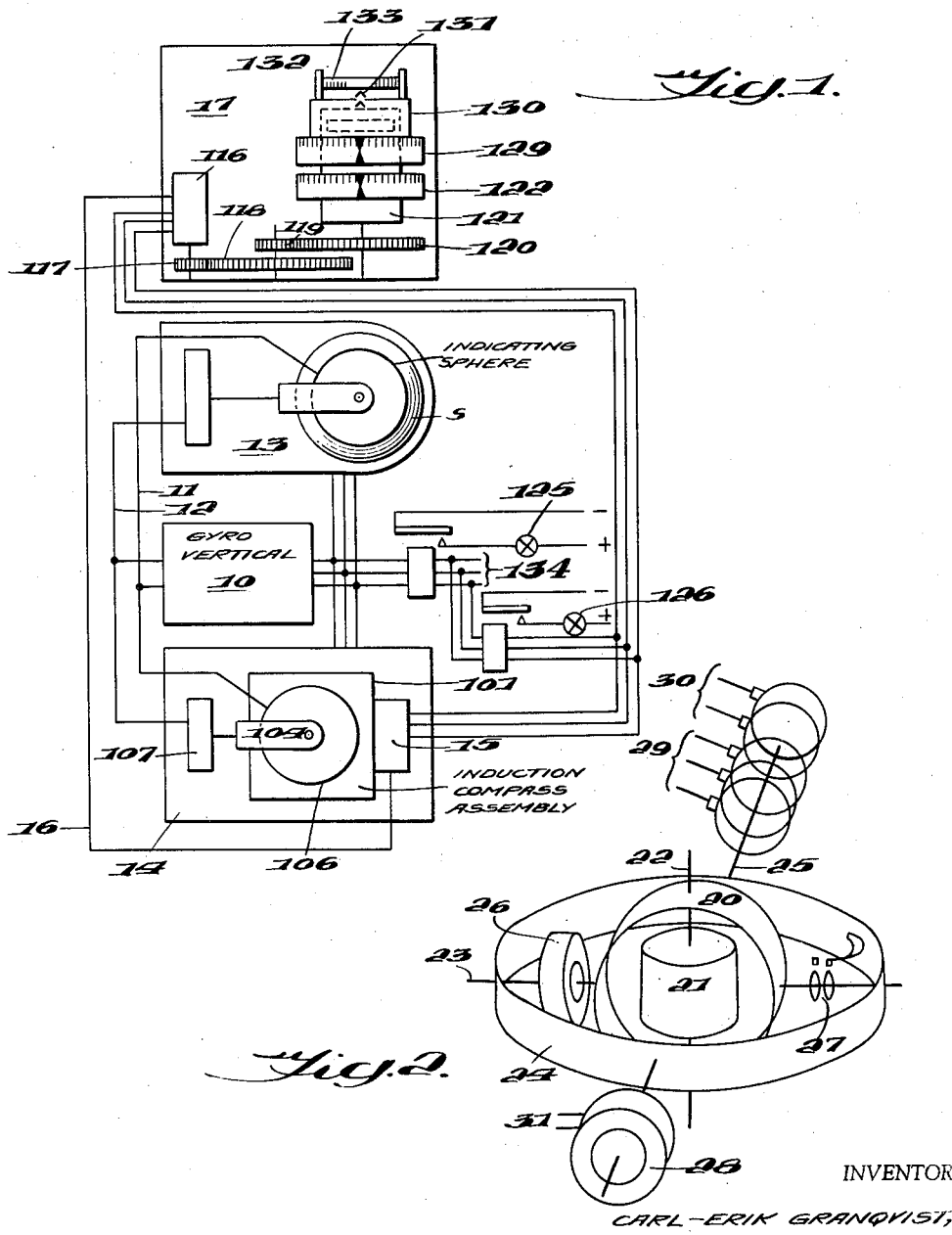

INVENTOR
CARL-ERIK GRANQVIST,
BY Larson and Taylor
ATTORNEYS

Nov. 25, 1958     CARL-ERIK GRANQVIST     2,861,350
GYRO SYSTEM, PARTICULARLY FOR FLIGHT NAVIGATIONAL PURPOSES
Filed Dec. 7, 1953     4 Sheets-Sheet 3
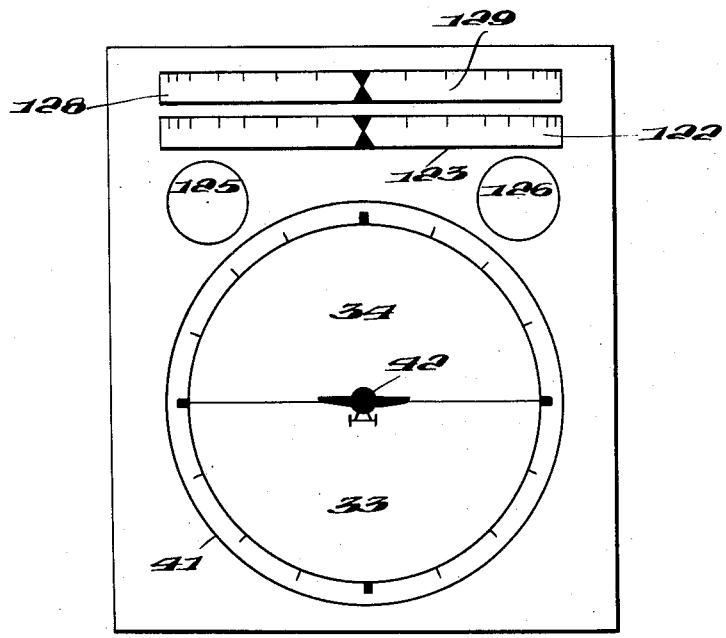
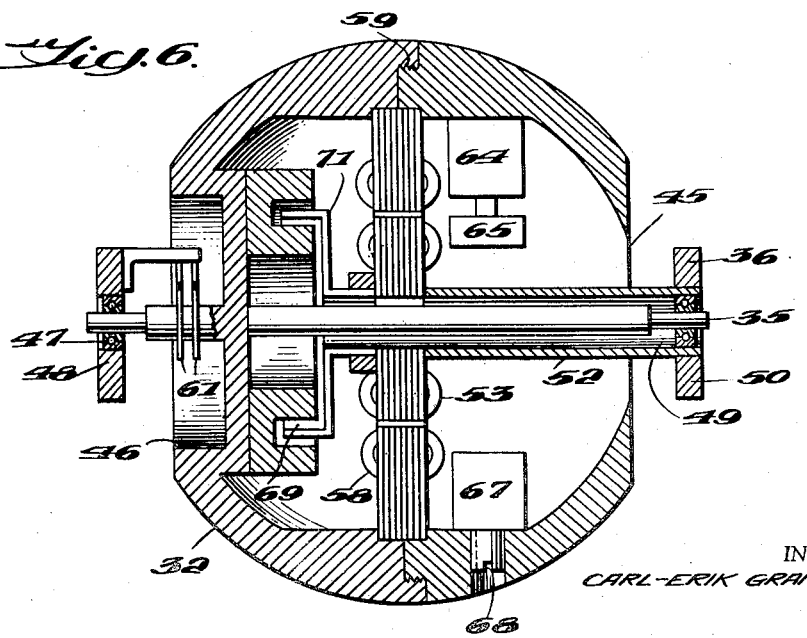
INVENTOR
CARL-ERIK GRANQVIST,
BY
ATTORNEYS Nov. 25, 1958    CARL-ERIK GRANQVIST    2,861,350
GYRO SYSTEM, PARTICULARLY FOR FLIGHT NAVIGATIONAL PURPOSES
Filed Dec. 7, 1953    4 Sheets-Sheet 4

INVENTOR
CARL-ERIK GRANQVIST,

BY
ATTORNEYS

United States Patent Office 2,861,350
Patented Nov. 25, 1958

2,861,350

GYRO SYSTEM, PARTICULARLY FOR FLIGHT NAVIGATIONAL PURPOSES

Carl-Erik Granqvist, Lidingo, Sweden, assignor to Svenska Aktiebolaget Gasaccumulator, Lidingo, near Stockholm, Sweden, a corporation of Sweden Application December 7, 1953, Serial No. 396,662

Claims priority, application Sweden October 26, 1953

6 Claims. (Cl. 33—204)

With the progress of aeronautical science ever greater demands have been made on the precision and operating efficiency of the instruments used in flight navigation. A long time ago it was found that ordinary arrangements, such as water levels, pendulums and the like, which were based in the operation upon the influence of gravity, were of a precision and dependability far from sufficient during aerobatic manoeuvres. A switch was therefore made to gyroscopes in various combinations. With the high velocities and consequent sharpening of aerobatic flying that have followed i. e. upon the advent of jet propulsion and the conquest of the sound barrier, even normal gyroscopes have proved insufficient for a number of cases. It is well-known to be common after the performing of aerobatic manoeuvres that a gyroscope that was correctly adjusted before the manoeuvre has acquired an appreciable error in its adjustment and therefore has to be readjusted as soon as possible after the manoeuvre has been completed in order to make it possible to rely on the gyroscope for orientation during flight.

The present invention refers to a system which is particularly suited for use as a flight navigation instrument and which has for an object to reduce the aforesaid risk of an error in the position of a gyroscope. It has already been proposed to increase the static as well as the dynamic mass of a gyroscope in order to improve its direction-conserving properties. This renders the gyroscope heavy as well as bulky. Since, further, it would be necessary in order to obtain information about the orientation of an aircraft in space with regard to at least two but preferably three mutually perpendicular planes forming a two- or three-dimensional space coordinate system, respectively, to use two or three gyroscopes, respectively, if earlier practice were to be adhered to, it has been proposed to use a so called "central" gyroscope. This term implies that a centrally located gyroscope is placed at some remote point of the aircraft where it will not interfere too much with the freedom of the crew, the gyroscope being provided with synchro transmitters for transmitting the angles in at least two but preferably all three of the aforesaid planes.

With regard to the first two coordinate planes the arrangement has usually comprised electromagnetic or similar synchro transmitters for transmitting the angles and arranged at each of the two gimbal-mounting points, i. e. at the suspension of the interior gimbal ring in the exterior gimbal ring as well as at the suspension of the latter in the aircraft body. The synchro transmitters were connected with receivers placed at the dash-board in the cockpit. These arrangements thus made it possible to observe the banking position as well as the angle of climb or dive present. These two indications thus represent the orientation of the aircraft in two mutually perpendicular planes, both of which are vertical, the one plane being that containing the longitudinal direction of the aircraft and the other being perpendicular thereto.

If an indication is to take place in the third plane also, i. e. in the horizontal plane, such indication would correspond to that of a compass. In prior use, the term directional gyro has usually been taken to mean that the property of the gyroscope of maintaining the orientation it has once obtained was to be utilized to indicate the direction of geographic north. However, in aircraft such a compass arrangement is not feasible for practical reasons. This is because the gyroscope will show an error when its mounting position is changed with regard to the earth's parallels. The rotational speed of the earth's surface is around 900 knots at the equator but at latitudes to the north or to the south therefrom it is smaller and velocities of this order of magnitude nowadays occur even at sea, whereas the velocities occurring in modern aviation are often many times higher.

For these reasons it is preferred in connection with central gyro systems to indicate the aircraft's course in the horizontal plane by means of an induction compass. Such a compass is comparable to a generator, which produces a voltage in dependence upon the horizontal component of the earth's magnetic field. The field magnets of the induction compass must therefore have an exactly horizontal position or, in other words, the axis on which the compass rotor turns must be exactly vertical. For the adjustment of these members in these positions synchro receivers are used also and are driven by the same synchro transmitters used also for producing the indications of the instruments associated with the orientation of the aircraft in the remaining two planes.

In the course of aerobatic flying the aircraft may perform very swift movements, and during these movements it may occasionally occur that two of the axes of the gyroscope are brought into coincidence. Investigations on which the present invention is based have shown that if two axes of the gyro coincide, it is hardly possible to avoid a coupling between the corresponding gyro shafts, which causes the one of the shafts that should not properly respond to the movement of the aircraft to acquire some of the rotation of the other shaft. This may give rise to substantial errors in the indication. In order to avoid this deficiency two different methods are available, which may be used singly or combined.

One method consists in preventing the rotation of the shaft that may be assumed to have no inherent tendency of rotation. This is done by locking this shaft against rotation immediately before its coincidence with the other shaft, the locking action being removed when the coincidence has ceased. The error in the position of the shaft that may be caused by this method can then be compensated for by means of special arrangements.

According to the other method the indicating member or indicator itself is made of such a large mass and such a large moment of inertia that it is unable to participate in an unproper rotation of a shaft, this kind of rotation occurring as a rule with a substantially higher speed than the proper rotations of the shafts. In other words, the indicator will have a tendency owing to its own large moment of inertia to assume a stable position, and the adjusting forces transmitted by the synchro arrangement are only of importance as minor adjusting influences, for instance for compensating for errors incurred on account of friction in the journallings of the indicator or the like.

The invention refers to a central gyro system, in which a self-adjusting indicator of the type referred to, having a large moment of inertia, is utilized. It is obviously of minor importance for the invention whether a single indicator is used to indicate displacements in two of the three reference planes or whether separate indicators are used to indicate these displacements. In practice, however, it will generally be preferable to use a single indicator.

Figure 4:
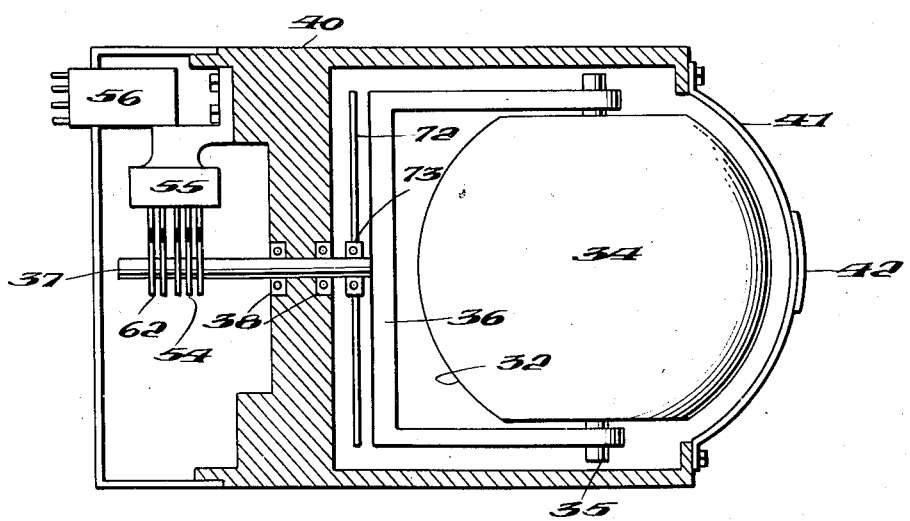

The invention will be described in more detail below with reference to the accompanying drawings, in which Fig. 1 shows a schematic diagram of the parts of a central gyro system, in which the direction in the third reference plane is indicated by means of an induction compass, Fig. 2 shows a somewhat more complete view of the gyroscope of the system in schematic representation, Fig. 3 shows a lateral view of the indicating instrument, Fig. 4 a plan view of the same, Fig. 5 a front view of the same, Fig. 6 the interior of the indicator forming part of the indicating instrument and having a large moment of inertia, and Fig. 7 a schematic illustration of the induction compass.

In Fig. 1, the central gyroscope is designated 10. In a manner known per se it is provided with synchro transmitters adapted to indicate the position of the gimbal mountings of the gyroscope in two mutually perpendicular planes, both of which are also perpendicular to the earth's surface. From the transmitters conductors 11 and 12 connect to the indicating instrument, which in the present instance comprises an artificial horizon. This instrument is designated 13 in Fig. 1. The same conductors 11 and 12 also connect with an induction compass 14 for adjusting the axis of rotation of the latter to be exactly vertical. The induction compass is provided with a synchro transmitter 15, which is connected through a conductor 16 with the compass indicator. Although this indicator has been shown as a separate unit 17 in order to simplify the presentation of Fig. 1, it is generally more suitable to arrange it in the manner illustrated in Fig. 5 in the same panel as the indicating instrument 13.

The gyro is illustrated schematically in Fig. 2. It comprises a rotor 21 rotatable in the interior gimbal ring 20 on a shaft 22, which is oriented vertically. The interior gimbal ring 20 is in its turn supported rotatably by means of a shaft 23 in the external gimbal ring 24, the latter being finally supported by means of a shaft 25 in the body of the aircraft. Since the arrangement of gyroscopes for these purposes is generally known, it will not be necessary to enter into a detailed discussion of its construction, and the schematic drawing of Fig. 2 will be sufficient for one skilled in the art.

It is of no importance to the invention how the rotation is imparted to the gyroscope rotor. The two commonest methods of doing this are, either to surround the rotor, which is constructed of a metal of good conductivity, with windings, in which a swiftly rotating field is set up, so that the rotor is rotated in much the same way as an induction motor, or to provide the rotor with minor ungular recesses against which a stream of gas is directed from one or more nozzles, thereby imparting rotation to the rotor through a kind of turbine action.

On the shaft between the interior and the exterior gimbal ring 20 and 24, respectively, there is mounted a first angle transmitter 26, in the form of a synchro transmitter, by means of which a remotely placed synchro receiver may be controlled to assume the same angular position as the synchro transmitter.

There are many types of synchro elements that are able to function alternatively as receivers or as transmitters. A very simple type of such an element comprises an interior and an exterior member, which are arranged in magnetic connection similarly to the rotor and the stator of an electric machine but preferably without distinct poles. The one of these members comprises a three-phase winding arranged to set up upon application thereto of a three-phase current a circular rotating field, whereas the other member is provided with a single-phase winding, in which a pulsating field is produced. If now the three-phase windings of the transmitter as well as the receiver are connected to the same three-phase mains leading from three-phase source 134, there will evidently be produced in them rotating fields that are mutually co-angular, provided that the conductors are short enough not to cause appreciable phase differences. The transmitter single-phase winding will thus receive an induced single-phase voltage of the same frequency as the three-phase voltage as long as the interior and the exterior members of the element are stationary with regard to each other, and this single-phase voltage will be applied to the corresponding member of the receiving synchro, which will then develop a pulsating magnetic field. This field automatically adjusts the mutual position of the interior and exterior members of the receiver until the pulsating field is co-directional with that component of the rotating field that is in time-phase coincidence with the pulsating field. If now a mutual displacement of the interior and exterior members of the transmitter should take place, this alters the time phase of the single-phase voltage and thus also of the single-phase voltage at the receiver, and the interior and exterior members thereof are immediately adjusted in accordance with the fresh phase conditions.

The following presentation will leave aside the specific type of synchro elements employed, but for simplicity's sake it will be assumed in connection with the embodiment shown that the element is of the type just referred to.

The three-phase winding of the synchro element 26 is assumed to be positioned on that part of the element which is connected with the outer gimbal ring 24, whereas its single-phase winding, which is placed on that member of the element which is connected with the inner gimbal ring, receives single-phase current through a pair of slip rings 27 in conjunction with a pair of brushes attached to a brush holder attached to the outer gimbal ring 24. In a similar manner the other synchro element 28 is placed between the outer gimbal ring 24 and the aircraft structure. That part of the element 28 which is connected with the outer gimbal ring 24 is assumed to carry the three-phase winding.

A three-phase voltage is applied to the windings of the synchro elements through slip rings and corresponding brushes, connected with conductors 29. The single-phase voltage of the synchro elements is taken off at the inner element via slip rings and brushes 27 to the outer gimbal ring and is fed through conductors located in the latter ring via slip rings and brushes on the shaft 25 to conductors 30. The single-phase winding of the outer element is connected directly to the conductors 31. The conductors 30 and 31 correspond to the conductors 11 and 12, respectively, illustrated in Fig. 1, and adapted to transmit the indication from the synchro transmitters to the receivers.

The gyroscope of Fig. 2 is suitably positioned at some point of the aircraft where sufficient space is available for it, and where the usually rather pronounced howl resulting from the gyroscope rotation is not too disturbing. The adjusting movements of the gyroscope are however transmitted by means of the elements 26 and 28 to receivers represented in Figs. 3–6, representing an artificial horizon, and in Fig. 7, representing an induction compass.

Fig. 3 shows the artificial horizon in vertical section in a plane parallel to the longitudinal direction of the aircraft. Fig. 4 shows the same horizon in horizontal projection and Fig. 5 the same horizon as seen from the cockpit, where it is assumed to be mounted in the panel. Fig. 6 shows a section of a sphere to be described in more detail below and which belongs to the artificial horizon. The figure shows a vertical section in a plane perpendicular to the longitudinal direction of the aircraft. In these figures, the same reference numbers designate the same parts throughout.

An artificial horizon, in accordance with established practice, comprises a bar, which irrespective of the diving or climbing manoeuvres of the aircraft is raised or lowered relative to a fixed mark, which is placed on the glass cover of the horizon and usually shows the contour of an aircraft. The bar is tilted relative to this contour when the aircraft is banked. In this manner it is possible to observe a banking, climbing or diving manoeuvre or any combination of these by comparing the position of the bar with that of the sign on the cover glass. An artificial horizon of this type, however, is scarcely usable during pronounced aerobatic manoeuvres, as the bar will then very soon move out of the area that is visible through the glass cover. The pilot would then have no guidance from the instrument.

Irrespective of whether a horizon bar is used or not, the present invention uses a sphere 32 of a very heavy material as the member which is primarily intended to give the pilot information about the position of the horizon relative to the aircraft.

The sphere 32 is hollow in order to accommodate some members to be described below. The purpose of constructing the sphere of a very heavy material is to make its inertia as large as possible. This is of advantage in making the sphere tend to maintain its orientation in space irrespective of the manoeuvres of the aircraft so that an equator drawn on this sphere will tend to stay parallel to the actual horizon. However, the sole inertia of the sphere cannot quite achieve this, for the friction occurring in the gimbal mountings of the sphere would cause displacements, unless compensated for, which would then be stored. The arrangement is therefore so chosen that the synchro elements transmit to the sphere only the amount of force required to overcome the frictional forces, the sphere striving otherwise to keep its correct orientation in space merely on account of its large mass and inertia. This serves the primary purpose of preventing the sphere from participating in swift movements that would occur if two of the shafts of the central gyro would occasionally coincide, the coupling between the shafts arising from such coincidence leading to an undesired rotation of one of the shafts.

It is apparent from the above that the mass of the sphere should be as large as possible and that it should preferably be located at the greatest possible distance from the centre in order to obtain the largest possible moment of inertia. For this purpose the sphere is constructed as a shell of a metal of a very high density. The four technically suitable metals that have the highest density are osmium, with a density of 22.5 gms./cm.$^3$, platinum, with a density of 21.4 gms./cm.$^3$, gold, with a density of 19.3 gms./cm.$^3$ and, finally, tungsten, with a density of 19.1 gms./cm.$^3$ Of technically suitable metals there follows then a gap before we come to lead, which has a density of 11.3 gms./cm.$^3$ It is apparent from this that one of the four first-mentioned metals should be used for the sphere. Osmium and platinum are however out of the question on account of being too rare and expensive and since the difference in density between gold and tungsten is very insignificant, whereas the difference in price is considerable, this leaves practically only tungsten for constructing the sphere.

The sphere should be given a surface treatment adapted to make the equator clearly visible. For instance, the lower half 33 of the sphere would be made blue and the upper half 34 red. The sphere 32 is rotatable on a shaft 35, which is suspended in a gimbal ring 36, which is in its turn rotatably supported on a second shaft 37. The latter shaft as well as the shaft 35 is disposed in the horizontal plane when the aircraft is flying horizontally but is perpendicular to the shaft 35. The shaft 37 is preferably supported in two or more ball bearings 38 for easy running.

The sphere 32 as well as the suspension means therefor is included in a casing 40, which is provided on the portion thereof facing towards the interior of the cockpit with a substantially spherical cover glass 41, on which there is painted or otherwise made a mark indicating the horizontal orientation with regard to banking as well as climb or dive. The mark may comprise in customary manner the contour of an aircraft 42.

In the interior of the sphere a synchro element is located. This element is connected to conductors 30, see Fig. 2, as well as to the three-phase mains so that it operates as a receiver in conjunction with the transmitter 26. A corresponding receiver element 43 is connected with the shaft 37, on the one hand, and with the fixed portions of the casing 40, on the other hand. This receiver is connected to the conductors 31, Fig. 2, so that it operates as a receiver corresponding to the transmitter 28.

As is apparent from the above, the sphere 32, owing to its large mass and consequent large moment of inertia tends to maintain its orientation in space irrespective of the manoeuvres of the aircraft. The sphere will then rotate on the shaft 35 if the aircraft makes a dive or a climb and on the shaft 37 jointly with the gimbal ring 36 if the aircraft is banked. In a dive for instance the upper red-covered half 34 of the sphere will therefore appear lowered as represented in Fig. 5, so that the horizon line will lie below the aircraft 42 marked on the cover 41.

If now the upper half of the sphere 32 is painted red, this increase in the red surface serves as a warning to the pilot. It is well-known that a major risk present in modern high velocity aircraft is that incurred in a dive without proper supervision, since it may happen within only a few seconds of such a dive that the velocity of the aircraft increases owing to gravitational acceleration until the sound barrier is reached. For instance, a certain jet-propelled military aircraft reaches the sound barrier after only 4 seconds of a vertical dive with an initial velocity equal to normal cruising velocity. If the angle of the dive is less than 90°, this short interval is lengthened somewhat but not enough to remove the very serious danger.

If the aircraft performs a climb, the equator of the sphere 32 will appear to be raised relative to the marking on the cover glass and a proportionately larger part of the visible surface of the sphere will be blue, thus showing that the plane is heading upwards toward the blue zone of the atmosphere. In a banking manoeuvre, a rotation takes place on the shaft 37 and the horizon, i. e. the equator of the sphere 32, will remain in the same spacial position and therefore appear tilted with regard to the marking on the cover glass. The pilot therefore obtains all the information he needs regarding the banking or the pitch of the airplane by merely looking at the sphere 32.

It is to be noted that the sphere 32 has full freedom of rotation in each of its planes of rotation, so that there is no restriction to an angle smaller than 360°, as has been the case in gyro systems hitherto used for flight navigation purposes. The pilot can therefore put his plane through a series of loops or rolls and the sphere will remain unaffected by these manoeuvres and will show the correct orientation even after the completion thereof. It is true that an occasional coincidence of two shafts of the central gyroscope may occur during these manoeuvres, resulting in an undesired coupling of the shafts, whereby one of the shafts takes up an angle that should have been applied to the other shaft and thereby is brought into an incorrect position, but this leaves the sphere largely unaffected on account of its great mass, which makes it tend to remain in correct spacial orientation. The synchro transmission from the central gyro to the sphere is provided only to compensate for the losses through friction incurred in movements of the sphere with regard to its gimbal rings or the aircraft structure.

If, for the aforesaid reasons, the central gyro should occasionally happen to assume an incorrect position, this is gradually rectified on account of the gyro action. Under normal conditions it may, however, take several minutes for such an incorrectly oriented gyro to reassume its correct position. In the system according to the present invention, however, the synchro element of the sphere 32 will then for a short time exert a braking action and diminish the tendency of the central gyro to faulty rotation, and upon completion of the manoeuvre the synchro elements associated with the sphere 32 will even to some extent assume the function of transmitters, the elements of the central gyro serving then as receivers. Actual tests have indicated that the time required for an incorrectly oriented central gyro to be bought back into correct space orientation could be reduced to only a fraction of the time that was required for this purpose in prior systems.

The interior of the sphere 32 is shown in Fig. 6, which is a section of the sphere along the shaft 35 on which it turns. The sphere 32 is flattened at both its poles. An aperture has thus been formed leading to the interior of the sphere at 45. At the opposite pole there is no corresponding aperture but instead a bowl-shaped part 46, at the centre of which the shaft 35 is integral therewith. The shaft 35 extends in one direction through the sphere and out through the aperture 45 and in the opposite direction through a bearing 47 in the arm 48 of the gimbal ring or frame 36. A corresponding bearing 49 is arranged in the other arm 50 of the gimbal ring. Preferably both bearings are constructed as smooth-running ball bearings.

The shaft 35 is surrounded by a tube 52, which extends inwards from the arm 50 of the gimbal ring and carries the inner part 53 of the synchro element in the interior of the sphere 32. The interior part 53 is preferably three-phase wound and the conductors are attached to the tube 52 and brought out of the sphere 32 through the slot between the aperture 45 thereof and the arm 50 of the gimbal ring 36. They then run along the gimbal ring and into its shaft 37, which is provided with a bore for that purpose, and are finally connected to three slip rings 54 on the shaft 37. These slip rings are associated with brushes supported by a brush holder 55, which is attached to the instrument frame. The frame also carries the terminal contact 56 to which the conductors 29, 30 and 31 are to be connected.

The synchro element, the one part of which is designated 53, cooperates with an outer part 58, which is mounted in the interior of the sphere 32. In order to make it possible to insert the part 58 into the sphere, this is constructed in two parts, which are threaded together after the synchro has been inserted by means of a thread 59. The conductors for the single-phase voltage to be applied to the synchro 58 run in the interior of the sphere to a pair of slip rings 61, which cooperate with brushes carried on the part 48 of the gimbal ring or frame. The conductors then run along the gimbal ring and are passed out through the hollow shaft 37 and are connected with the slip rings 62. The further path for the current is formed by brushes, the brush holder 55 and contact terminal 56.

The synchro element 43 for adjusting the angular position of the shaft 37 has applied to the inner part thereof a three-phase current through slip rings 54. To the outer part there is accordingly applied a single-phase current, which flows through conductors 63 to terminals 56.

The sphere may be out of balance, in which case it will act as a pendulum. However, such a function is not very desirable, since a pendulum is influenced both by acceleration and centrifugal forces. These forces will therefore disturb the fixed orientation of the sphere in space and might even in a severe instance exert a disturbing action on the central gyro through the synchro elements. It is therefore clearly advantageous to have the sphere in exact balance.

On the other hand it may be of advantage to have the sphere out of balance so that it is able to adjust itself pendulum-wise when the plane is standing on the ground. The sphere will then have the correct space orientation already at take-off and a reading can be had immediately from the artificial horizon. It may also be of importance when flying against a visible horizon to be able to switch off the electric connections temporarily and if the sphere is then out of balance it will automatically adjust itself into correct space orientation, if it has previously lost its orientation owing to unforeseen circumstances.

It is thus apparent that it is desirable for the sphere to be perfectly balanced when in operation but to be out of balance when not in operation. This is achieved according to the invention in the following manner. A coil 64 is mounted in the interior of the sphere, and it is connected in series with the winding of the synchro element 58. When the system operates the conductor connecting with the outer part of the synchro element 58 carries current and the coil is therefore magnetized, so that it attracts its armature 65. The axis of the coil is substantially radial with regard to the rotation of the sphere 32 on the shaft 35. If the sphere is balanced when the armature 65 is attracted, it will consequently be out of balance when the armature is released.

In order to adjust the balance of the sphere when the armature 65 is attracted, a counter-poise 67 is arranged radially adjustable by means of a screw 68, which may be operated from outside. In order to achieve perfect balance of the sphere 32 it is desirable to have a further adjustable weight in the interior thereof, which should be adjustable in a direction perpendicular to the direction of adjustment of the armature 65 and the counter-poise 68. This weight may be similar to the counter-poise 67 but of smaller mass.

The complicated arrangement comprising the mass of the sphere 32 electrically synchro-coupled to that of the central gyro requires that attention be paid to the possible existence of various interferences, which may resonate with divers vibrations occurring in the aircraft, for instance in the engine. In particular, such vibrations may occur and have a slowly but continuously varying frequency, when the sound barrier is approached or has just been passed and the plane is accelerating. It is therefore absolutely necessary that the various parts of the sphere be well damped against vibrations in order to avoid a misorientation of the sphere on account of such interferences which would otherwise be possible however well the sphere is balanced.

In order to damp oscillations that may possibly occur about the shaft 35 there is mounted in the interior of the sphere a bowl-shaped permanent magnet 69 with a circular air gap, into which extends the rim of a bowl-shaped copper disc 71. When the disc is rotating with regard to the permanent magnet, eddy currents will be induced in it. This gives a most preferable form of damping, comparable to a friction force without initial friction varying as a simple function of the velocity.

A similar damping arrangement should preferably be provided between the shaft 37 and the instrument casing. As it is possible to use also other types of dampers than the one described above and comprising elements 69 and 71, there has been shown in Figs. 3 and 4 as an instance of such a damper a disc, which is rotatably mounted on the shaft 37 by means of a ball bearing 73. This type of damper is known per se. Its function is based on friction in the bearing 73, which acts as a brake upon a sudden rotation of the shaft 37 and imparts at the same time an acceleration to the disc 72. If now the shaft 37 tends to oscillate, it will change the direction of its rotation. The disc 72, however, has already attained a certain speed in the prior direction of the shaft and this speed first has to be reduced to zero, whereupon the disc is accelerated in the opposite direction. There will therefore be a perpetual movement of the shaft 37 and the disc 72 mutually with periodic changes of direction. However, the two oscillations will be substantially in phase quadrature, so that no coupling increasing the oscillations can occur. On the other hand the continual friction in the bearing will exert a damping action on both oscillations.

It was mentioned above that the aircraft should preferably be provided with a means of indicating its orientation in space in three different planes. One of these planes is represented by the rotation on the shaft 37, whereas another plane corresponds to the rotation on the shaft 35. The third plane will then be parallel to the earth's surface and the corresponding indication is suitably obtained from an induction compass.

Figure 7:
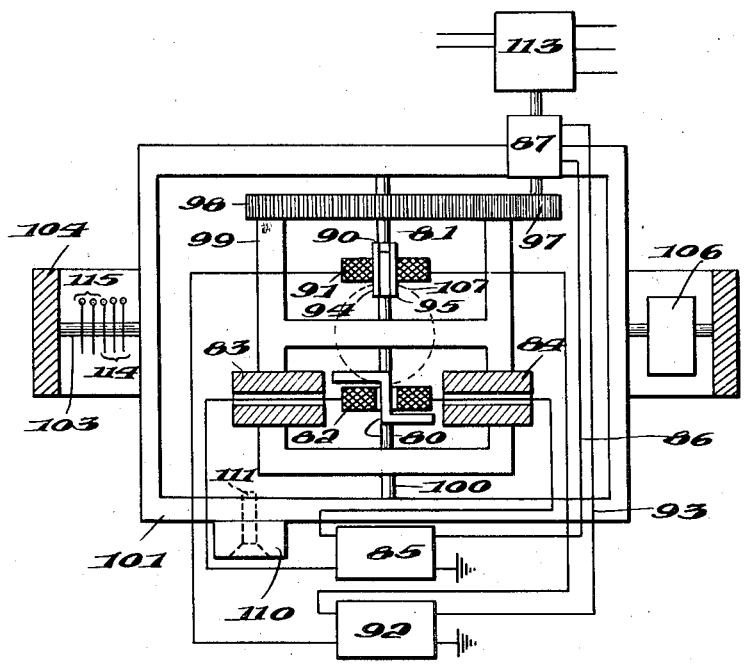

This arrangement is illustrated in Fig. 7. The induction compass is assumed to be of the previously known type comprising a so called Z-armature. This armature is designated 80 in Fig. 7. It is adapted, when the compass is in operation, to rotate at a high speed on a shaft 81 forming at the same time the middle portion of the armature. The two armature poles are disposed in different horizontal planes and extend in opposite directions. The middle or shaft portion is surrounded by a winding 82. The stator poles, which are preferably formed of very soft iron, are mounted so as to face each other. They are represented by reference numbers 83 and 84. The poles may have bores for accommodating the conductors connecting with the coil 82, but these connections can also be made in any other way. The conductors are connected with an amplifier and discriminator 85, which rectifies the voltage induced in the coil, whereupon the rectified voltage is applied through a conductor 86 to an adjusting device 87.

There are many different methods of providing for the automatic adjustment. One method utilizes two induction compass units on the same shaft disposed so as to have the stator as well as the rotor poles form an angle of 90°. This embodiment is assumed in Fig. 7. The second compass unit then comprises the armature 90 and the winding or coil 91, the conductors of which are brought to the amplifier and discriminator 92. The output voltage of this discriminator is also applied to the adjusting device 87.

In the embodiment shown, the adjusting device 87 comprises a motor, which is adapted to turn in a direction depending upon which of the voltages on conductor 86 and conductor 93 is the highest. The rotation of the motor 87 will not stop until the voltages of both conductors are the same. It is well known that the output voltage of the discriminator is a maximum when the stator poles, such as the poles 83 and 84 or the poles 94 and 95, are in the direction north to south, whereas the voltage is zero when the poles are in the direction east to west. The directions, of course, refer to the magnetic field of the earth and not to the geographic concepts. Since the stator poles of both compasses are oriented at right angles it is obvious that the voltage balance is obtained when the stator poles of one unit are in the north-west to south-east direction and the poles of the other unit in the north-east to south-west direction. Any change in the position of the poles with regard to the magnetic meridian will immediately give an unbalance and this will cause the adjusting motor 87 to start turning in such a way as to remove the unbalance.

The motor 87 by means of a pinion 97 and a gearing 98 on the casing 99 of the induction compass units is able to turn the casing about a shaft 100, which is coaxial with that of the compasses and is journalled in a gimbal ring or frame 101. The frame 101 is in its turn journalled by means of a shaft 103 at right angles to the shafts 81 and 100 in an outer frame 104, which is journalled in the aircraft structure by means of a shaft disposed at right angles to the plane of Fig. 7 and therefore not visible in the figure.

It is of importance that the induction compass be as remote as possible from the iron that may be present in the aircraft, for instance in its engine. It may therefore be suitable to mount it in one of the wing-tips, the stressed parts of which should then be of a non-magnetic material. Such positioning of the induction compass away from the other instrument equipment and particularly from the central gyro is very much facilitated by the fact that the control of the compass as well as the control of the indicating instrument through the compass are performed as a remote control by synchro devices.

For instance, the gimbal mounting of the induction compass is provided in order that the plane of rotation of the compass will always be horizontal. This makes the arrangement independent of errors due to the vertical component of the earth's magnetism. Each of the two gimbal shafts has therefore mounted thereon a synchro element 106 or 107, respectively, the element 106 being mounted with one part thereof connected to the inner gimbal ring or frame 101 and with its other part connected to the outer gimbal ring 104, both parts being coaxial with the shaft 103, whereas the synchro element 107 is mounted with one part connected to the outer gimbal ring 104 and with the other part connected to the aircraft structure, both parts being coaxial with the shaft not illustrated in the drawing, about which the outer gimbal ring is rotatable with regard to the aircraft structure.

As is shown in Fig. 1, the two synchro elements are connected through conductors 11 and 12 to the corresponding synchro receivers of the central gyroscope as well as to the corresponding synchro element of the artificial horizon. It was pointed out above to be of importance for the orientation reference member of the artificial horizon comprising the sphere 32 to be fully balanced. Since however the gimbal mounting of the sphere is coupled by synchros to the gimbal mounting of the induction compass, an unbalance of the induction compass could conceivably be translated to the sphere 32 if the induction compass were not also balanced. On the other hand the armatures of the induction compass rotate at a considerable speed and therefore have some gyroscopic stabilizing action on the compass. Since it is desirable for other reasons that the armatures should be of small weight, this stabilizing action is usually not large. It is therefore of some importance that the induction compass be also statically well balanced, but on the other hand this balance does not have to be maintained with the same degree of precision as that of the sphere 32.

To compensate for the unbalance in the compass that might arise from the motor 87 and certain devices associated therewith, to which reference will be made below, a counter-poise 110 is mounted on the inner gimbal frame 101. This counter-poise may be adjustable, if required, so as to make possible adjustment of the balance by means of an adjusting screw 111.

It is apparent from the above description of the function of the induction compass that the corrective adjustments thereof are produced by the motor 87 so that the rotation of this motor is indicative of the compass adjustment and the compensation brought about by the changed course of the airplane in the horizontal plane. The indicating instrument used for indicating the course of the aircraft in the horizontal plane should therefore respond to the rotation of the motor. To this end there is arranged on the same shaft as the motor 87 a separate synchro transmitter 113, to which is applied a three-phase current similarly to the other synchro elements of the system. The three-phase current is applied via slip rings from the airplane structure to the outer gimbal frame and through an additional set of slip rings 114 from the outer to the inner gimbal frame. The single-phase voltage at the output of the synchro transmitter 113 is applied through corresponding slip rings, comprising slip rings 115 on the shaft between the inner and the outer gimbal frames as well as further slip rings, not illustrated in the drawing, between the outer gimbal frame and the aircraft structure, to a synchro receiver 116 forming part of the indicating instrument 17 of Fig. 1. This receiver is coupled through a number of cascaded gearings 117–120 to the shaft of a drum 121 of the indicating instrument.

The translation ratio of the gear train 117–120 is the same as that of pinion 97 and gearing 98, so that the drum 121 will turn by exactly the same angle as the induction compass. The position of the drum will therefore indicate magnetic north. On the drum 121 there is disposed a ring 122 adapted to support in the ordinary manner a compass card. The ring is visible through a window 123 of the instrument unit, to which belong also the cover glass 41 and the sphere 32 visible within the glass. The pilot may therefore ascertain the banking as well as the pitch angles by observing the equator of the sphere and compare its position with that of the aircraft contour 42 marked on the cover glass and is at the same time able to read the course indication on the upper scale. The pilot thus obtains in concentrated form all three projected coordinates of the aircraft path.

The instrument further comprises a pair of signal lamps 125 and 126, which are provided in order to indicate to the pilot that the system is ready to function. The lamp 125 may for instance be connected with a contact of a relay, through which passes the three-phase current for the synchro element transmitting the gimbal movements of the central gyro to the sphere and to the induction compass and the lamp 126 may be similarly controlled by the three-phase current applied to the synchro device associated with the rotation of the induction compass in the horizontal plane.

For many purposes it is desirable during flight conditions not only to know the course at each particular instant but also the rate at which the course is being changed. An instrument for this purpose can also be accommodated within the instrument casing. The indication is made at a window 128, which may for instance be disposed immediately above the window 123. Behind the window 128 a second ring 129 is visible. This ring surrounds a bowl-shaped part 130, which is suspended in a centred needle-bearing 131 on top of the drum 121. The bowl-shaped part 130 is made of a good conductor, for instance copper, and a permanent magnet 132 is mounted in the interior of the drum, which is in the present instance of non-metallic material. Upon rotation of the drum the magnet 132 will move relative to the bowl-shaped part 130 and set up eddy currents therein, thus causing this part to be influenced by a couple, the strength of which increases with the speed of the drum 121. However, the rotation of the bowl-shaped part 130 is counteracted by a spring 133 so that the part 130 as well as the ring 129 attached thereto will turn in the same direction as the drum 121 through an angle determined by the spring 133, this angle being unequivocally determined by the couple referred to or, in other words, by the speed of the drum 121.

The scale on the ring 129 visible in the window 128 may be graduated for instance in degrees per second.

The invention is not restricted to the embodiment described and illustrated but is obviously capable of modifications within the spirit and scope of the appended claims.

What is claimed is:

1. An artificial horizon, particularly for flight navigation purposes, comprising a balanced sphere in the form of a hollow shell of a metal having a density higher than that of lead and being provided with indicator means, gimbals having gimbal shafts forming mounting means for said sphere, and means for correcting minor errors of alignment caused by friction and the like comprising, a central gyroscope having a gimbal mounted rotor and one synchro transmitter for each of the gimbal shafts, a synchro receiver for each of the sphere gimbal shafts, one of said synchro receivers being disposed in the interior of said sphere, and means connecting each of said transmitters to the corresponding receiver to transmit movements of said rotor gimbal shafts to said sphere gimbal shafts.

2. An artificial horizon as claimed in claim 1, in which the said sphere is made of tungsten.

3. An artificial horizon as claimed in claim 1, in which the gimbal shafts for the sphere are provided with damping means adapted to suppress oscillations of the sphere.

4. An artificial horizon as claimed in claim 3, in which at least one of the said damping means comprises an eddy current damping arrangement.

5. An artificial horizon as claimed in claim 1 in which said sphere comprises an electromagnet and an armature one of which is attached to the body of the sphere in such a way that while the sphere is in its operating condition energization of the electromagnet and consequent attraction of the armature causes the sphere to be balanced, whereas while the sphere is in its nonoperating condition deenergization of the magnet and consequent release of the armature causes the center of gravity of the sphere to be displaced.

6. An artificial horizon as claimed in claim 5 in which a counterpoise is movably attached to the body of said sphere, said counterpoise comprising means for adjusting the position of said counterpoise relative to the sphere.

References Cited in the file of this patent

UNITED STATES PATENTS

| | | |
|---|---|---|
| 1,988,591 | Gillmor | Jan. 22, 1935 |
| 2,080,490 | Kollsman | May 18, 1937 |
| 2,232,537 | Kollsman | Feb. 18, 1941 |
| 2,450,874 | Braddon | Oct. 12, 1948 |
| 2,469,403 | Parker | May 10, 1949 |
| 2,636,161 | Hoover | Apr. 21, 1953 |

FOREIGN PATENTS

| | | |
|---|---|---|
| 134,234 | Great Britain | Nov. 6, 1919 |